United States Patent [19]

Small

[11] Patent Number: 4,679,761

[45] Date of Patent: Jul. 14, 1987

[54] VIBRATION DISSIPATION MOUNT FOR MOTORS OR THE LIKE

[75] Inventor: Thomas R. Small, Brookeville, Md.

[73] Assignee: The Johns Hopkins University, Baltimore, Md.

[21] Appl. No.: 313,246

[22] Filed: Oct. 21, 1981

[51] Int. Cl.$^4$ .......................................... F16M 13/00
[52] U.S. Cl. .................................. 248/609; 248/632; 248/636; 267/57.1 R; 267/63 A
[58] Field of Search ............... 248/609, 632, 636, 568, 248/569; 267/140.3, 140.4, 140.5, 141.3, 57.1 R, 63 A; 310/51

[56] References Cited

U.S. PATENT DOCUMENTS

| | | | |
|---|---|---|---|
| 1,845,551 | 2/1932 | Mitzl | 248/568 |
| 1,866,154 | 7/1932 | Ell | 248/568 |
| 2,147,660 | 2/1939 | Loewus | 248/613 |
| 2,268,204 | 12/1941 | Dunham | 248/568 X |
| 2,386,503 | 10/1945 | Pressley | 248/613 |
| 2,462,272 | 2/1949 | Martin | 248/568 |
| 2,830,826 | 4/1958 | Mantzel | 267/63 A X |
| 3,142,162 | 7/1964 | Herndon, Jr. et al. | 248/613 X |
| 3,245,646 | 4/1966 | Baratoff | 248/568 |
| 4,112,785 | 9/1978 | Brobeck | 74/572 |

FOREIGN PATENT DOCUMENTS

| | | | |
|---|---|---|---|
| 199009 | 8/1958 | Fed. Rep. of Germany | 267/63 A |
| 2640703 | 3/1978 | Fed. Rep. of Germany | 248/632 |
| 2334227 | 7/1977 | France | 310/51 |
| 327060 | 2/1958 | Switzerland | 248/632 |
| 904925 | 9/1962 | United Kingdom | 248/632 |

Primary Examiner—Robert W. Gibson, Jr.
Assistant Examiner—David L. Talbott
Attorney, Agent, or Firm—Robert E. Archibald

[57] ABSTRACT

A vibration dissipation mount which permits the mounting of a motor, generator, or the like such that the rotatable shaft thereof passes through the mount and the mount permits the dissipation of self-induced and otherwise induced vibrations wherein the mount comprises a pair of plates having complementary concave and convex surfaces, a semi-resilient material being disposed therebetween.

8 Claims, 3 Drawing Figures

VIBRATION DISSIPATION MOUNT FOR MOTORS OR THE LIKE

STATEMENT OF GOVERNMENTAL INTEREST

The Government has rights in this invention pursuant to Contract No. EC-77-C-01-5085 awarded by the U.S. Department of Energy.

BACKGROUND AND/OR ENVIRONMENT OF THE INVENTION

1. Field of the Invention

The present invention relates to vibration dissipation mounts, and more particularly to a vibration dissipation mount for apparatuses such as motors, generators, or the like which have a rotating shaft.

2. Description of the Contemporary and/or Prior Art

The desirability of permitting a motor, generator, or the like to vibrate freely relative to the surface to which it is mounted has been well recognized. Such freedom of movement translated to the motor and generator apparatus by the shaft thereof from objects which are mounted to the shaft. In high speed rotational applications such as in the driving of a flywheel by a motor and the withdrawal of energy from the flywheel by a generator, when the flywheel is rotating at very high speeds, vibration caused by the flywheel as a result of manufacturing imbalances and design imperfections cannot only prove destructive to the flywheel itself but also can cause failure of the motor and generator used in conjunction therewith.

Several attempts have been made in the prior art to solve this problem. In particular, U.S. Pat. 1,845,551 issued to J. Mitzl on Feb. 16, 1932 teaches a motor supporting apparatus wherein a motor is suspended and supported by a plurality of springs disposed between the motor case and the motor shaft housing. This is a rather elaborate arrangement requiring many springs which must be matched or tuned to provide effective dampening.

U.S. Pat. No. 1,866,154 issued to L. Ell on July 5, 1932 teaches the mounting of a motor within the cylinder of a vacuum cleaner wherein the motor is coaxially disposed within the cylinder. A plurality of flat springs, which engage the outer circumferential surface of the motor, suspend the motor within the cylinder, the springs acting as vibration dampers.

U.S. Pat. No. 2,268,204 issued to G. W. Dunham on Dec. 30, 1941 describes a washing machine wherein the motor thereof is mounted to a supporting surface by a substantially U-shaped bracket which engages the ends of the motor casing, a resilient material being disposed between the bracket and the casing ends.

U.S. Pat. No. 2,386,503 issued to J. H. Pressley on Oct. 9, 1945 teaches a driving mechanism for phonograph turntables wherein the motor thereof is hard mounted to a plate. The plate is then mounted to a supporting surface by a plurality of bolts with grommets disposed between the plate and the supporting surface. The plate floats above the supporting surface with contact being provided by the grommet sandwiched between the plate and the supporting surface. The plates are substantially flat and the shapes thereof do not cooperate with each other.

Shock mounts which include resilient members are generally known in the art, U.S. Pat. Nos. 2,147,660 issued to J. S. Loewus on Feb. 21, 1939 and 3,245,646 issued to P. Baratoff on Apr. 12, 1966 being representative of this type of mount. An application for such a mount is shown in U.S. Pat. No. 3,142,162 issued to W. B. Herndon, Jr. et al on July 28, 1964.

U.S. Pat. No. 2,462,272 issued to G. W. Martin on Feb. 22, 1949 discloses a steering stabilizer wherein a motor is mounted above a motor support so that it may rotate relative thereto. A plurality of resilient members are shown for disposition between the motor and the motor support.

Another problem associated with heavy rotational bodies, turning at high rotational speeds, i.e. supercritical operation is a phenomena known as whirl which is a nutation of the rotational body that causes flexing of the shaft on which the body is mounted. The previously discussed patents do not address this problem.

Although the particular configurations of vibration dissipation mounts known in the art may have some merit in their particular applications, none have the simplicity nor the desired stability for use in critical applications such as in supporting of an apparatus which drives or receives rotational energy from a flywheel storage apparatus. The present invention overcomes the problems associated with the prior art by providing a vibration dissipation mounting for a motor or the like which dissipates vibration energy including whirl energy, the mounting including a pair of complementary plates, one of the plates having a convex surface, the other of the plates having a complementary concave surface, and a cushioning means such as a resilient pad or the like being disposed therebetween, such that static as well as dynamic stability is achieved through the forming of these plates rather than through the use of additional structure.

SUMMARY OF THE INVENTION

Therefore, a primary object of the present invention is to provide a vibration dissipation mount for mounting a motor or generator or the like relative to a supporting surface such that the mount permits dissipation of self-induced vibration as well as vibration caused by structure coupled to the motor or generator through a drive shaft.

A further object of the present invention is to provide a vibration dissipation mount wherein static as well as dynamic stability is achieved using a minimum of parts and a simple structure.

A still further object of the present invention is to provide a vibration dissipation mount wherein the shaft of the motor or generator used in conjunction therewith passes centrally through the mount for space and design economies.

An additional object of the present invention is to dissipate whirl energy present when a relatively heavy body is rotated at high rotational speeds, the body being mounted on a flexible shaft.

Still another further object of the present invention is to provide a vibration dissipation mount for mounting a motor or generator or the like which is simple in design, inexpensive to manufacture, efficient in operation, and durable.

These objects, as well as further objects and advantages of the present invention, will become readily apparent after reading the ensuing description of a nonlimiting illustrative embodiment and viewing the accompanying drawing.

A vibration dissipation mount for mounting a motor, generator, or the like having a rotating shaft, to a supporting surface, in accordance with the principles of the present invention, comprises a pair of complementary plates, one of the plates having a convex surface, the other of the plates having a complementary concave surface, each of the plates having disposed therethrough and opening through the surface thereof an aperture, the apertures being dimensioned to accommodate therethrough and to permit free rotation of the rotating shaft when the plates are disposed in complementary relationship, one of the plates being adapted to be affixed to the motor or the like, the other of the plates being adapted to be affixed to the supporting surface; and cushioning means being disposed between the plates. The cushioning means may take the configuration of a semi-resilient pad or the like and the convex and concave surfaces are preferably conical or semi-spherical in shape although other shapes may also be employed.

BRIEF DESCRIPTION OF THE DRAWING

In order that the present invention may be more fully understood, it will now be described, by way of example, with reference to the accompanying drawing in which.

DESCRIPTION OF THE PREFERRED EMBODIMENT

Figure 1:
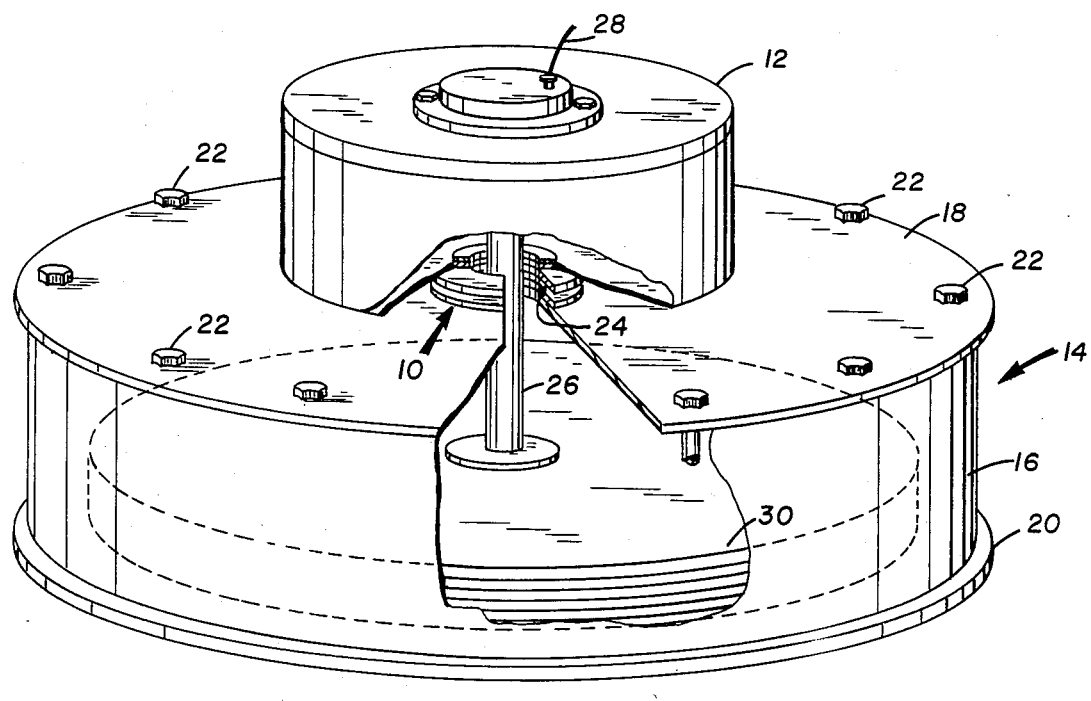
FIG. 1 is a partially broken away pictorial representation, in perspective, of the preferred embodiment of the present invention.

Referring now to the figures, and more particularly to FIG. 1 thereof, there is illustrated therein a vibration dissipation mount 10 which mounts a motor/generator 12 to a flywheel test chamber 14. The flywheel test chamber 14 includes a containment ring 16 and top and bottom panels 18 and 20 fixedly secured by a plurality of bolts 22 such that the containment ring 16 is clamped therebetween. An aperture 24 is disposed through the top panel 18 and accommodates therethrough a rotatable shaft 26 provided by the motor/generator 12. The motor/generator 12 includes an electrical cable 28 through which power can be supplied to the motor/generator 12 or can be withdrawn therefrom. Mounted on the rotatable shaft 26, is a superflywheel energy storage device 30 representative of one of the many types of devices which may be supported by the shaft 26. When power is supplied to the motor/generator 12 through the electrical cable 28, rotation of the shaft 26 and therefore the flywheel 30 is accomplished. Once the flywheel is spinning, the rotational energy stored therein is converted to electrical energy by the motor/generator 12 and can be withdrawn from the electrical cable 28.

During the operation of the motor/generator 12 this structure naturally creates self-induced vibrations. In addition, due to manufacturing and material constraints of the flywheel 30, vibration is created thereby upon rotation. Additionally, when rotation is in the supercritical regime whirl develops in the system. If the motor/generator 12 was fixedly secured to the top panel 18 of the flywheel chamber 14 all of these vibrations, including whirl both self-induced and induced by the superflywheel 30, would have to be dissipated by the shaft 26 most likely leading to failure of this shaft. Through the employment of the vibration dissipation mount 10, this result is avoided.

Figure 2:
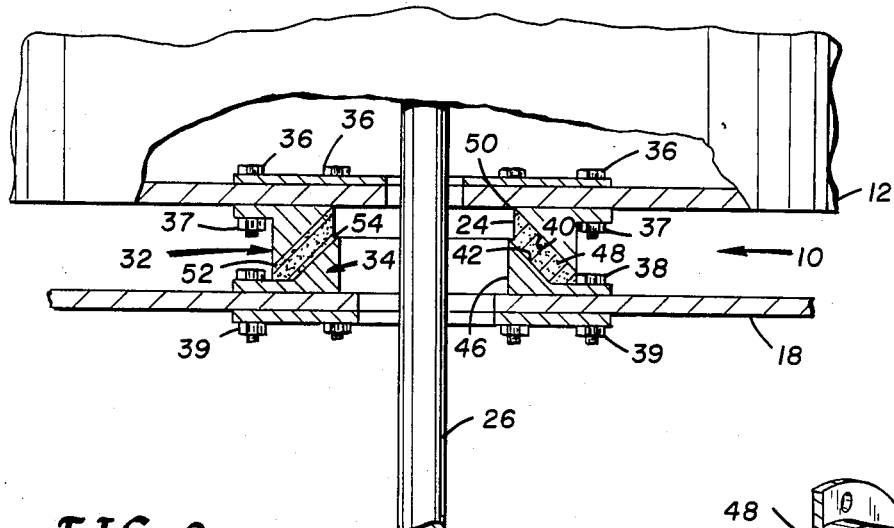
FIG. 2 is an enlarged cross-sectional side elevation of the preferred embodiment of the present invention.
Figure 3:
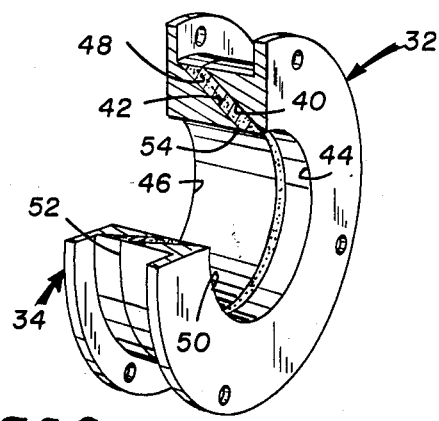
FIG. 3 is a perspective view, in partial cross-section, of the preferred embodiment.

With reference to FIGS. 2 and 3, the details of the vibration dissipation mount 10 can be described. The mount 10 includes a pair of complementary plates 32 and 34, plate 32 being fixedly secured by a plurality of bolts 36 and complementary nuts 37 to the housing of the motor/generator 12, plate 34 being fixedly secured by a plurality of bolts 38 and complementary nuts 39 to the top panel 18 of the flywheel test chamber 14. The plate 32 includes a concave surface 40 and the plate 34 includes a complementary convex surface 42. Disposed through the plate 34 and opening through the concave surface 40 thereof is an aperture 44. Disposed through the plate 34 and opening through the convex surface 42 is an aperture 46. The apertures 44 and 46 are dimensioned so that they can accommodate therethrough and permit free rotation of the rotatable shaft 26, the apertures 44 and 46 being substantially coaxial when the plates 32 and 34 are disposed in a complementary relationship as illustrated in FIGS. 2 and 3.

Disposed between the complementary plates 32 and 34 is a semi-resilient material 48 such as natural or synthetic rubber or another elastometer or the like. The semi-resilient material 48 is substantially annular in shape and is tapered to conform to the concave surface 40 and complementary convex surface 42, the semi-resilient material 48 therefore being sandwiched between the surfaces 40 and 42 and physically isolating these surfaces from each other.

Concave and convex as used herein are to have a very broad definition implying a complementary relationship and are not to be taken in the narrow sense of implying a complementary relationship limited to curved surfaces. Concave therefore refers generally to a depressed surface and convex to a protruding surface. The concave surface 40 and convex surface 42 are shaped as substantially truncated cones as illustrated although other complementary shapes may be employed. For instance, the surfaces 40 and 42 could be semi-spherical, radially undulated, etc. The concave surface 40 has the upper and lower edges 50 and 52 thereof defining a pair of spaced apart planes, the end edge 54 of the convex surface 42 defining a plane which falls substantially between the planes defined by the end edges 50 and 52 of the concave surface 40. This arrangement limits the degree of lateral movement of the complementary plates 32 and 34 relative to each other providing for stability in the mount 10. Of course, the end edges of the plates 32 and 34 do not necessarily have to be entirely disposed in a single plane and, depending upon the shaping of the surfaces 40 and 42 other configurations are possible as long as there is a general overlapping of these surfaces when disposed inside each other in complementary relationship. Additionally, the invention is not limited to configuration where the end edge of the convex surface must terminate in a plane intermediate the planes defined by the edges of the concave surface. A possible configuration would have the convex surface extending through the concave surface with lateral dampening being enjoyed as long as a portion of the convex surface is disposed between the planes defined by the concave surface.

When the motor/generator 12 is energized or when the flywheel 30 is rotating and the motor/generator 12 is converting energy therefrom to electrical energy, it can be seen that the housing of the motor/generator 14, as mounted by the vibration dissipation mount 10, effectively floats over the top panel 18 of the flywheel test chamber 14 on the semi-resilient material 48, vibrations therefore effectively being dissipated. Depending upon the degree of resiliency selected for the semi-resilient material 48, different operational characteristics can be achieved and the relative "stiffness" of the vibration dissipation mount 10 can be varied. Although the vibration dissipation mount 10 is illustrated with the plate 32, having a concave surface, fixedly secured to the housing of the motor/generator 12 and the plate 34, having the convex surface 42, illustrated fixedly secured to the top panel 18 of the flywheel test chamber 14, it is to be understood that these two components can be interchanged as desired.

As illustrated, with the rotatable shaft 26 oriented in a substantially vertical position, no affixment between the complementary plates 32 and 34 and the semi-resilient material 48 is required since gravity will keep these components in their proper position. If the rotating shaft is to be oriented in other than a substantially vertical position the semi-resilient material 48 can be specially selected and can be bonded to the complementary plates 32 and 34 such that the load presented by the motor/generator 12 or similar structure can be satisfactorily supported.

It will be understood that various changes in the details, materials, and arrangements of parts, and operational conditions which have been herein described and illustrated in order to explain the nature of the invention may be made by those skilled in the art within the principles and scope of the invention.

Having thus set forth the nature of the invention, what is claimed is:

1. A vibration dissipation mount for a flywheel assembly comprising:
   a flywheel;
   a rotating shaft connected at a first end to said flywheel;
   a flywheel chamber which encloses said flywheel and into which said rotating shaft passes;
   a motor connected to a second end of said rotating shaft for driving said flywheel;
   a pair of complementary plates, one of said plates having a convex surface, the other of said plates having a complementary concave surface, each of said plates having an aperture extending through said complementary surfaces thereof, said apertures being dimensioned to accommodate there through and to permit free rotation of said rotating shaft when said plates are disposed in complementary relationship, one of said plates being affixed to said motor, the other of said paltes being affixed to said flywheel chamber; and
   a cushioning means being disposed between said plates.

2. A vibration dissipation mount in accordance with claim 1, wherein said concave surface has end edges defining a pair of spaced apart planes, said concave and convex surfaces and said cushioning means being dimensioned such that when said concave and convex surfaces are disposed in said complementary relationship with said cushioning means therebetween, at least a portion of said convex surface falls in a plane intermediate said spaced apart planes.

3. A vibration dissipation mount in accordance with claim 2, wherein said convex surface has the end edge thereof adjacent to said cushioning means falling in a plane intermediate said spaced apart planes defined by said concave surface.

4. A vibration dissipation mount in accordance with claim 1, wherein said convex and concave surfaces are each shaped as a truncated cone.

5. A vibration dissipation mount in accordance with claim 4, wherein said concave surface shaped as a truncated cone has the end edges of said truncated cone define a pair of spaced apart planes, said concave and convex surfaces and said cushioning means being dimensioned such that when said concave and convex surfaces are disposed in said complementary relationship with said cushioning means therebetween, the end edge of said convex surface adjacent to said cushioning means falls in a plane intermediate said spaced apart planes.

6. A vibration dissipation mount in accordance with claim 4, wherein said plate having said concave surface is fixedly secured to said motor, said plate having said convex surface being fixedly secured to said flywheel chamber.

7. A vibration dissipation mount in accordance with claim 1, wherein said cushioning means comprises a semi-resilient material configured to be disposed between said pair of complementary plates.

8. A vibration dissipation mount in accordance with claim 7, wherein said semi-resilient material is annular in shape and has a hole therethrough, said hole aligning with said apertures disposed in said pair of complementary plates when disposed therebetween.

* * * * *